United States Patent [19]
Sugihara et al.

[11] Patent Number: 5,523,802
[45] Date of Patent: Jun. 4, 1996

[54] DUAL-MODE IMAGE DISPLAY APPARATUS FOR DISPLAYING COLOR IMAGES AND BLACK-AND-WHITE IMAGES

[75] Inventors: Shouichi Sugihara; Masaki Yamakawa, both of Kyoto, Japan

[73] Assignee: Mitsubishi Denki Kabushiki Kaisha, Tokyo, Japan

[21] Appl. No.: 183,418

[22] Filed: Jan. 19, 1994

[30] Foreign Application Priority Data

Feb. 5, 1993 [JP] Japan .................................. 5-018486

[51] Int. Cl.$^6$ ................................................ H04N 9/12
[52] U.S. Cl. ........................ 348/743; 348/816; 348/835; 348/791; 348/786
[58] Field of Search ...................... 348/816, 742, 348/835, 790, 791, 743, 744, 781, 785, 786; 345/151; 358/232, 242; 359/891, 490, 502, 776, 805, 889, 634, 629, 637, 639, 497, 494, 498, 502, 501; H04N 9/16, 9/12, 5/72, 9/30

[56] References Cited

U.S. PATENT DOCUMENTS

| | | | |
|---|---|---|---|
| 4,399,455 | 8/1983 | Alvarez | 348/743 |
| 4,758,818 | 7/1988 | Vatne | 348/742 |
| 5,357,288 | 10/1994 | Hiroshima | 348/742 |

FOREIGN PATENT DOCUMENTS

449928  5/1985  Japan .

OTHER PUBLICATIONS

"Television" by F. Kerkhof & W. Werner, Philips Technical Library, pp. 376–379, first published 1952.

Liquid Crystal Apparatus for Converting Black and White CRT Display into Colored Display, IBM Technical Disclosure Bulletin, A. N. Brinson & A. D. Edgar, vol. 22, No. 5, pp. 1769–1771, Oct. 1979.

*Primary Examiner*—Safet Metjahic
*Assistant Examiner*—Sherrie Hsia

[57] ABSTRACT

A dual-mode image display apparatus includes a black-and-white image display device and a selective filter. The selective filter is caused to assume a first mode in which it sequentially serves as red, green and blue filters, and a second mode in which it transmits all the color components. Thus, the image display apparatus can selectively perform color display or black-and-white display. The selective filter may include variable optical retarders and may be caused to selectively assume the first mode or the second mode through control over the variable optical retarders. The selective filter may alternatively be moved by a motor between a first position in which the filter is in the path of light from the display device to the viewer, and a second position in which the filter is out of the path of light. A power supply controller is also used to conserve power by turning unneeded parts of a color image processing circuit OFF when the display apparatus is in the second mode.

41 Claims, 10 Drawing Sheets

|   | VOR 54 | VOR 56 | OUTPUT LIGHT |
|---|--------|--------|--------------|
| a | ON     | ON     | G            |
| b | ON     | OFF    | R            |
| c | OFF    | ON     | B            |
| d | OFF    | OFF    | R,G,B        |

DUAL-MODE IMAGE DISPLAY APPARATUS FOR DISPLAYING COLOR IMAGES AND BLACK-AND-WHITE IMAGES

BACKGROUND OF THE INVENTION

The present invention relates to an image display apparatus that can display color images by using field- or frame-sequential color signals.

Figure 1:
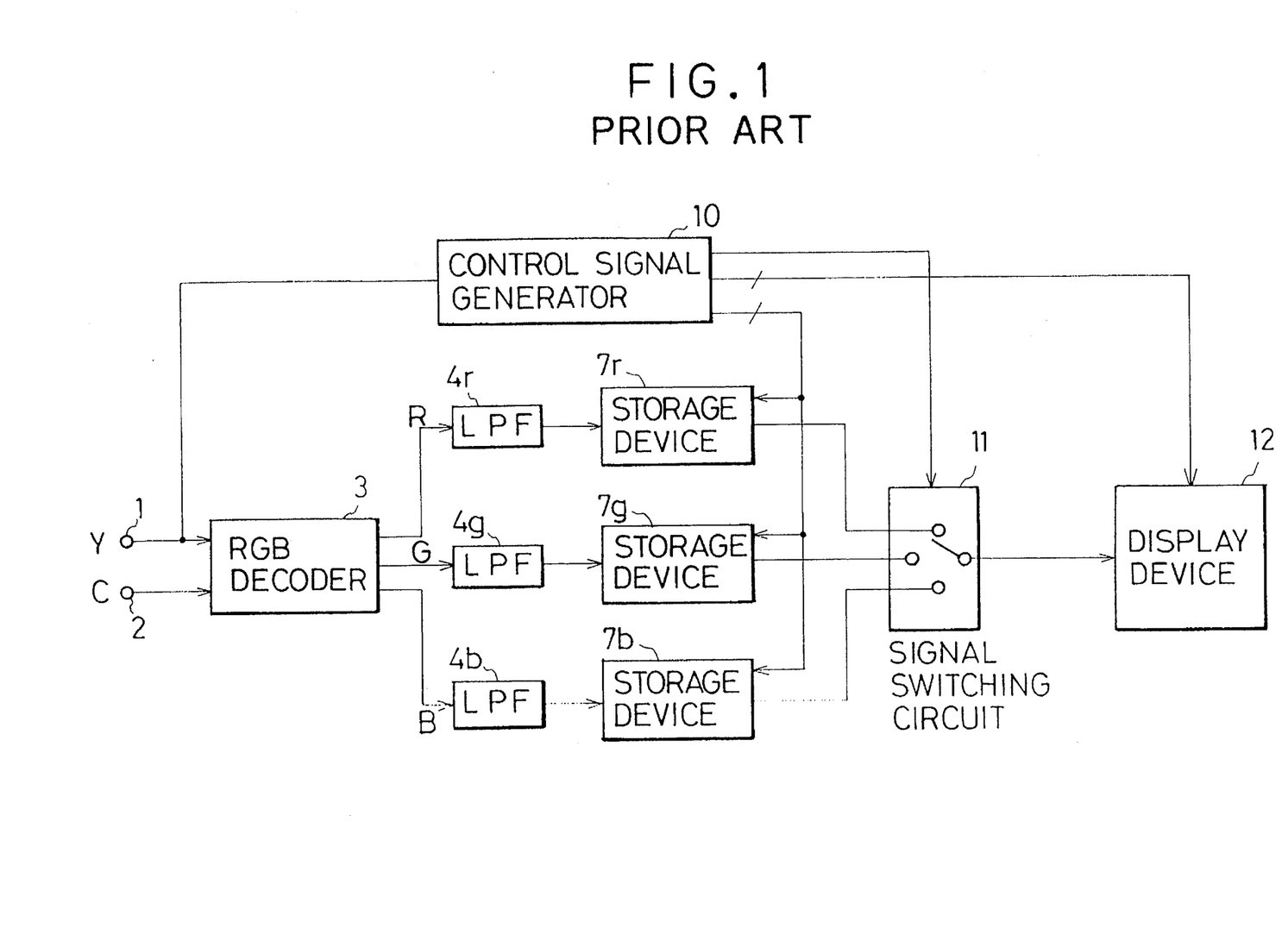
FIG. 1 is a block diagram showing a conventional image display apparatus.

FIG. 1 shows a conventional field-sequential image display apparatus, which receives a standard television signal (e.g., of NTSC or PAL system) and converts the standard television signal into field-sequential signals for display. The illustrated image display apparatus comprises a luminance signal input terminal 1, a chrominance signal input terminal 2, low-pass filters 4r, 4g and 4b, storage devices 7r, 7g and 7b, a control signal generator 10, a signal switching device 11 and a display device 12.

A luminance signal representing the brightness, and also defining the resolution, is applied to the input terminal 1. A chrominance signal representing color components is applied to the input terminal 2. Usually, sync signals are added to the luminance signal, and color burst signals are added to the chrominance signal. The luminance signal and the chrominance signal are input to the RGB decoder 3.

The RGB decoder 3 comprises a detector circuit performing a synchronous detection of a chrominance signal using the color burst signal as a reference, and a matrix circuit receiving the outputs of the detector circuit and the luminance signal, and produces three-primary-color signals of red (R), green (G) and blue (B). The R, G and B signals produced from the RGB decoder 3 are band-limited by the low-pass filters 4r, 4g and 4b and are then input to the R, G and B storage devices 7r, 7g and 7b.

The R, G and B storage devices 7r, 7g and 7b store signals of one field (for 1/60 seconds, in the case of the NTSC system). The signals from the storage devices 7r, 7g and 7b are sequentially selected by the signal switching circuit 11, and are then input to the display device 12 for display of color images. The control signal generator 10 is responsive to the sync signals added to the luminance signal, and produces control signals for control over the signal switching circuit 11 and the display device 12.

Figure 2:
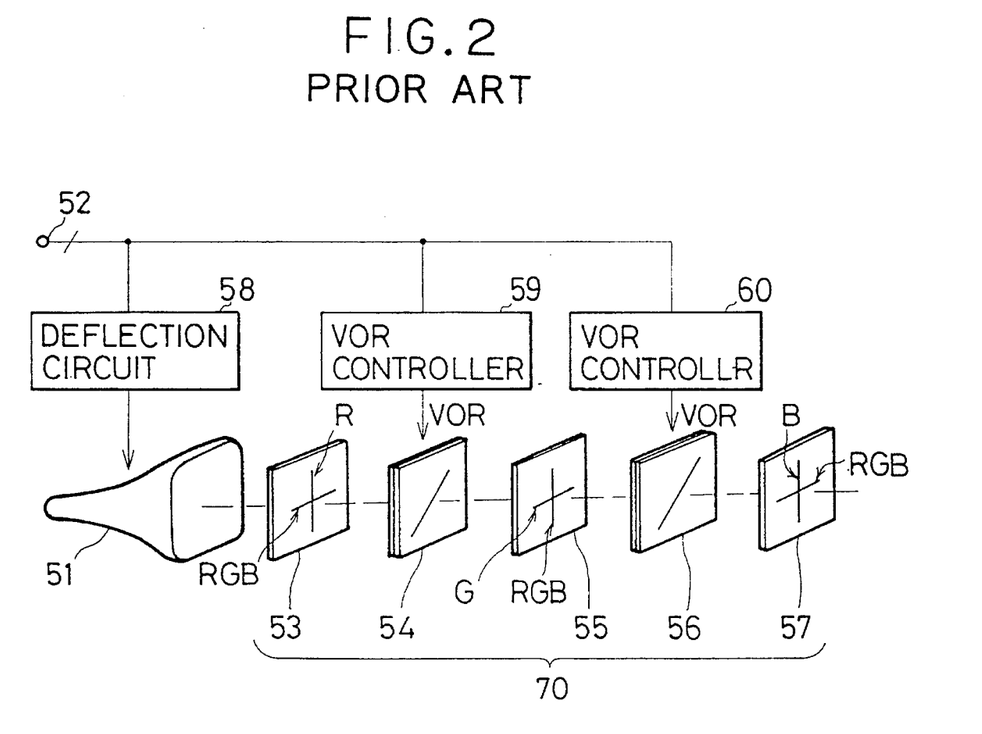
FIG. 2 is schematic diagram showing a filter device used in the image display apparatus of FIG, 1.
Figure 3:
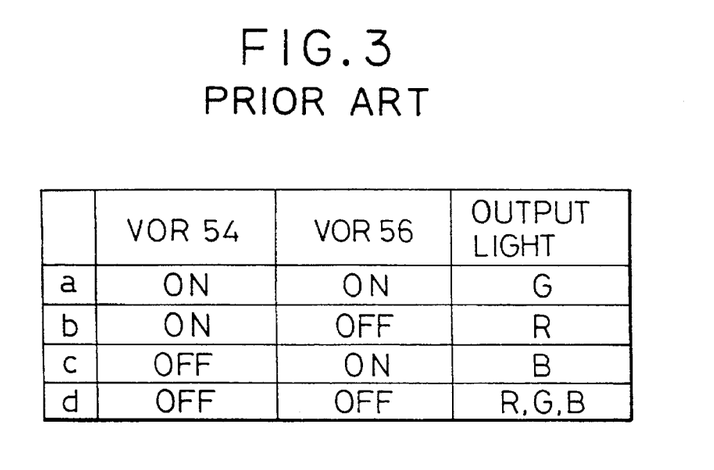
FIG. 3 shows a table for explaining the operation of the filter device of FIG, 2.

As disclosed in Japanese Patent Kokoku Publication No. H4-49928, the display device 12 can be configured as illustrated in FIG. 2. The illustrated display device 12 comprises a cathode-ray tube (CRT) for black-and-white display, and polarization filters 53, 55 and 57. The polarization filter 53 has a polarization axis for transmission of red light only, and a polarization axis for transmission of all color components. The polarization filter 55 has a polarization axis for transmission of green light only, and a polarization axis for transmission of all color components. The polarization filter 57 has a polarization axis for transmission of blue light only, and a polarization axis for transmission of all color components. The display device also comprises variable optical retarders (VOR) 54 and 56 in the form of a liquid crystal switch. Each of the variable optical retarders 54 and 56 is selectively turned on or off. When the variable optical retarder (54 or 56) is turned on, the optical retardation of the light transmitting through it is substantially zero. When the variable optical retarder (54 or 56) is turned off, the optical retardation of the light transmitting through it is substantially half the wave length. By selection from the combinations of the operative states of the variable optical retarders 54 and 56, either red, green, blue or white light is output from the selective filter 70, as shown in FIG. 3. That is, when the variable optical retarders 54 and 56 are both on as at (a), only green light is passed or output. When the variable optical retarder is 54 on and the variable optical retarder is off as at (b), only red light is passed or output. When the variable optical retarder is 54 off and the variable optical retarder is on as at (c), only blue light is passed or output. When the variable optical retarders 54 and 56 are both off as at (d), all the color components are passed, so that white light is output.

The variable optical retarders 54 and 56 are respectively controlled by a VOR controllers 59 and 60, such that R, G and B output lights are obtained as shown in FIG. 3. The signals input to the CRT 51 and the control over the polarization filters 53, 55 and 57 are synchronized so as to achieve color image display. A deflection circuit 58 drives the CRT 51. Various control signals from the control signal generator 10 are delivered via a terminal 52 to the respective circuits.

The field-sequential color image display device as described above does not have a shadow mask, and has a high resolution as a small-size color display device.

Figure 4:
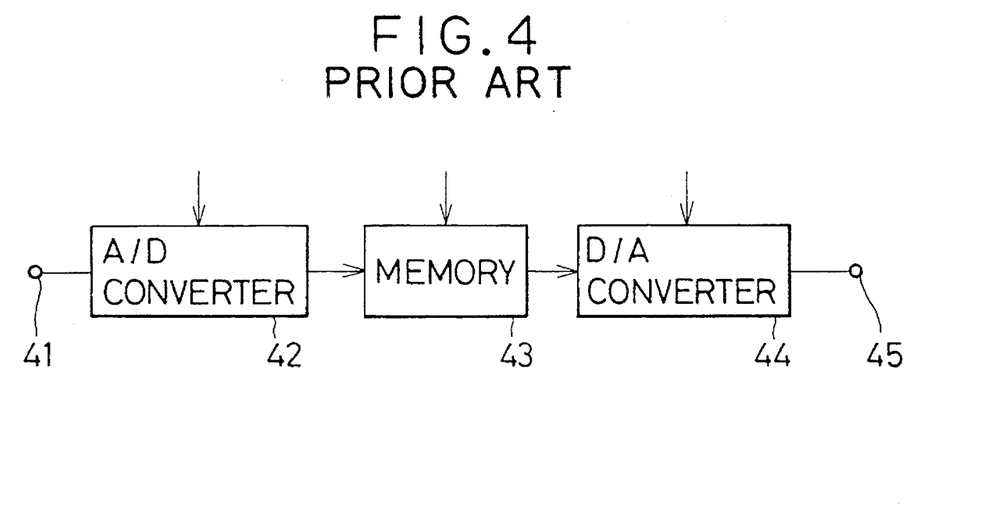
FIG. 4 is a block diagram showing the configuration of the storage devices of FIG. 1.

The storage devices 7r, 7g and 7b store the R, G and B signals, and are used for converting the simultaneous or parallel signals into field-sequential signals. Each of the storage devices 7r, 7g and 7b may comprise, as shown in FIG. 4, an input terminal 41 to which a color signal of R, G or B is input, an A/D converter 42 for converting the input color signal in the form of an analog signal into a digital form, a memory 43 which usually is formed of a semiconductor memory that has a storage capacity of one field of color signals and is in the form of a dual port memory capable of simultaneous input and output, a D/A converter 44 for converting the digital signal into an analog signal and an output terminal 45.

The frequency at which data is written in the memory 43 is different from the frequency at which the data is read from the memory 43. Assume for instance that the display is made using field sequential signals. The field frequency of the NTSC system is 60 Hz. When the R, G and B signals were sequentially selected at 60 Hz, the frequency at which each of the three colors is used for display would be 20 Hz. This lower frequency would cause flicker. To avoid flicker, the R, G and B signals are sequentially selected at 180 Hz, so that each of the R, G and B signals are selected at 60 Hz. The field frequency in this case is 180 Hz. The memory 43 and the D/A converter 44 are accordingly required to operate at a high speed.

Figure 5A:
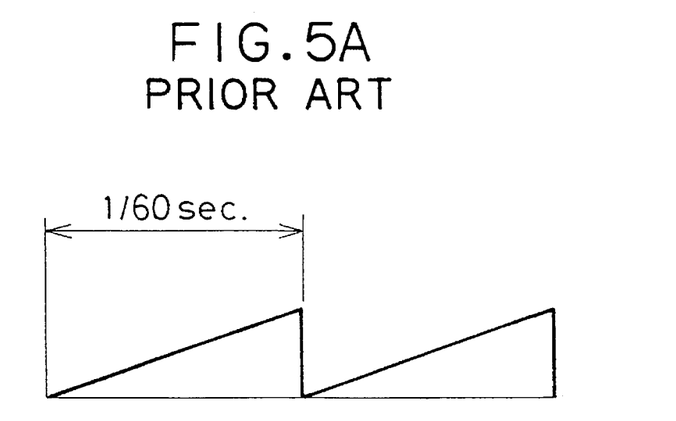
FIG. 5A and FIG. 5B are waveform diagrams showing the rate of writing in and the reading from the storage device of FIG. 1.
Figure 5B:
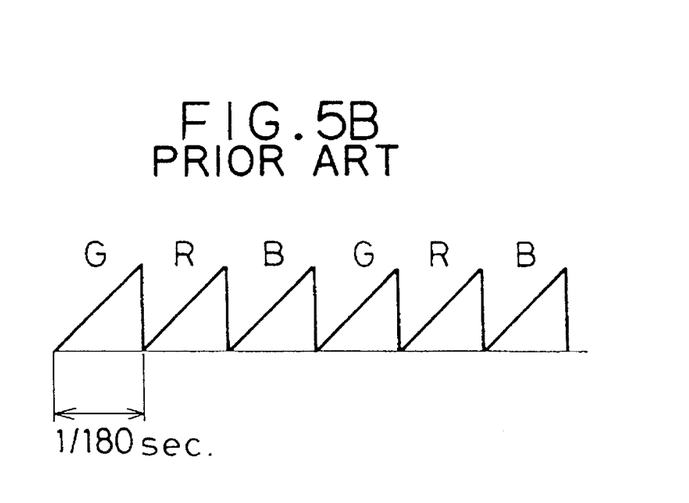

FIG. 5A shows the writing in the memory, while FIG. 5B shows the reading and scanning on the CRT 51.

Provided in front of the input 41 to the A/D converter 42 is the low-pass filter 4r, 4g or 4b. This is to band-limit the signals within the Nyquist frequency in order to remove aliasing noises due to sampling.

The above described field-sequential color image display device can be used for a small-size color display device or a projection-type color display device.

However, the color display device described above is inferior to monochromatic display devices, in some respects, in particular, the resolution, the brightness and the power consumption. These inferiority is problematical when, for instance, the display device is used for a monitor (viewfinder) in a video camera.

First, let us consider the brightness of the image. In the above described image color display device, the selective Filter comprising the polarization filters 53, 55 and 57, and the variable optical retarders 54 and 56 is provided in front of the screen of the CRT 51. The output light is inevitably attenuated by these elements. For white light, the light output from the polarization filter 57 is about one tenth of the light emitted from the CRT 51.

Secondly, let us consider the resolution of the image. Since a black-and-white CRT is used, it is theoretically possible to obtain an equal resolution. However, in practice there are limiting factors. First, it is necessary to perform high-rate scanning. As shown in FIG. 5B, the scanning rate is three times that of the scanning speed of the standard television. Scanning at such a high rate is necessary to avoid flicker, as described above. As a result, the frequency of reading from the memory 43 is three times the frequency of writing in the memory 43. There is however a limit in the capacity and the speed of the memory 43. As described above, the input to the memory 43 is band-limited within the Nyquist frequency.

Figure 6A:
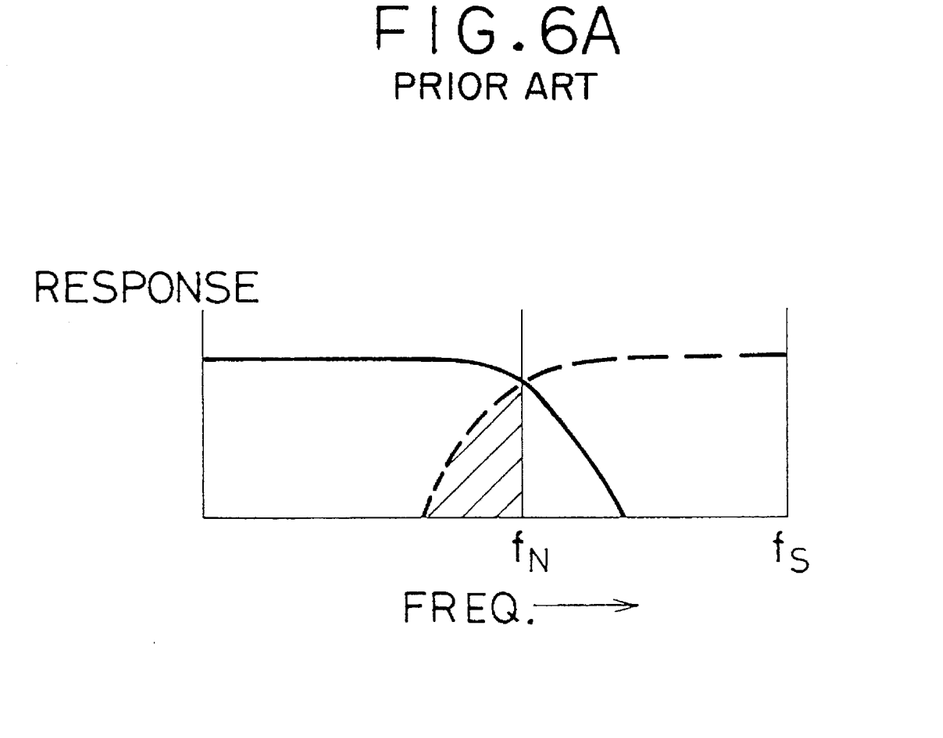
FIG. 6A and FIG. 6B are diagrams showing the frequency distribution of the signals and aliasing noises.
Figure 6B:
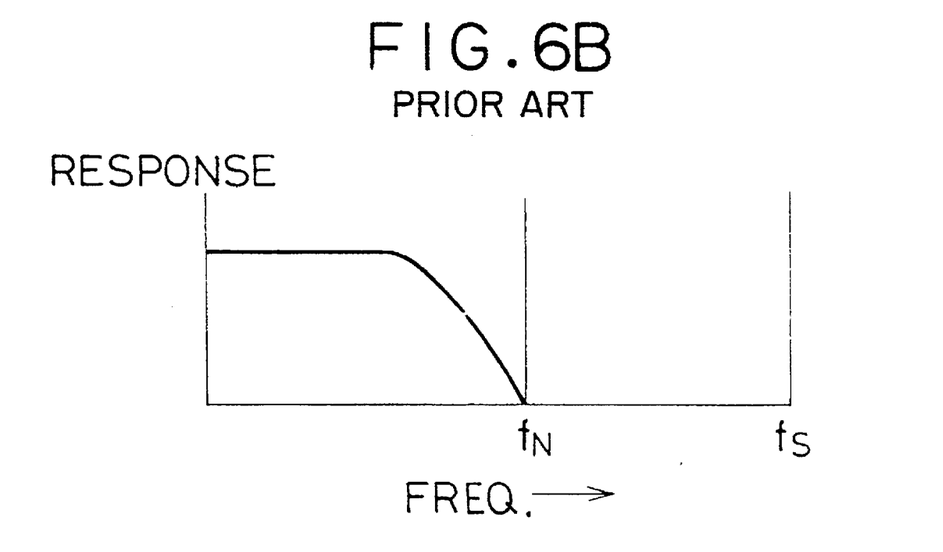

This is explained with reference to FIG. 6A and FIG. 6B. When a signal of a frequency above the Nyquist frequency $f_N$ is applied as shown in FIG. 6A, aliasing noises shown by hatching are created and cannot be removed in the subsequent stages. To prevent the creation of the aliasing noises, the signal needs to be band-limited by the low-pass filter within a frequency one half the sampling frequency. The output of the low-pass filter is as shown in FIG. 6B, and does not have a broad frequency band. On the other hand, when a high-frequency scanning is conducted, the frequency of the signals is raised three times so that the circuit components in the stages after the output of the storage memory, including the drive circuit of the CRT, must have a broad frequency band.

Thirdly, let us consider the power consumption. There are circuit components which are required for color image display, but are not required for the black-and-white image display. That is, the RGB decoder 3, the LPF's 4r, 4g and 4b, and the storage devices 7r, 7g and 7b and the signal switching circuit 11 are required for the color image display, but not for the black-and-white image display. Moreover, the high-speed operation is not required for the black-and-white image display. Thus, the power consumption is larger for the color image display. This is particularly problematical where the color image display device is powered from a battery.

On the other hand, color image display has advantages over the black-and-white image display. For instance, when the color image display device Is used for a viewfinder, it is possible to examine the color fidelity (whether the color of the subject to be imaged is reproduced correctly). Moreover, it is much easier to find or follow a certain subject to be imaged. Furthermore, iris adjustment is easier because the part of the image which is outside the dynamic range loses color.

As has been described with regard to the prior art, because the resolution of the prior art is low, the focus adjustment is difficult. Moreover, because the brightness is low in the prior art, a picture having a high contrast cannot be seen well even if a brightness adjustment is made.

SUMMARY OF THE INVENTION

An object of the invention is to eliminate the problems of the prior art.

Another object of the invention is to provide an image display apparatus which can selectively display color images or black-and-white images.

Another object of the invention is to provide an image display apparatus which facilitates manipulation for zooming, panning, tilting, iris adjustment, and the like, and which also can produce images of higher resolution, higher brightness, and higher contrast.

Another object of the invention is to provide an image display apparatus which can reduce power consumption.

An image display apparatus according to the invention includes:

a black-and-white image display device;

a selective filter; and means for causing said selective filter to assume a first mode in which it sequentially serves as red, green and blue filters, and a second mode in which it transmits all the color components;

whereby the image display apparatus can selectively perform color display or black-and-white display.

The selective filter may comprise variable optical retarders and may be controlled to selectively assume the first mode or the second mode through control over the variable optical retarders. The selective filter may be moved by a moving means between a first position in which the filter is in the path of light from the display device to the viewer, and a second position in which the filter is out of the path of light.

DETAILED DESCRIPTION OF THE PREFERRED EMBODIMENTS

Embodiment 1

Figure 7:
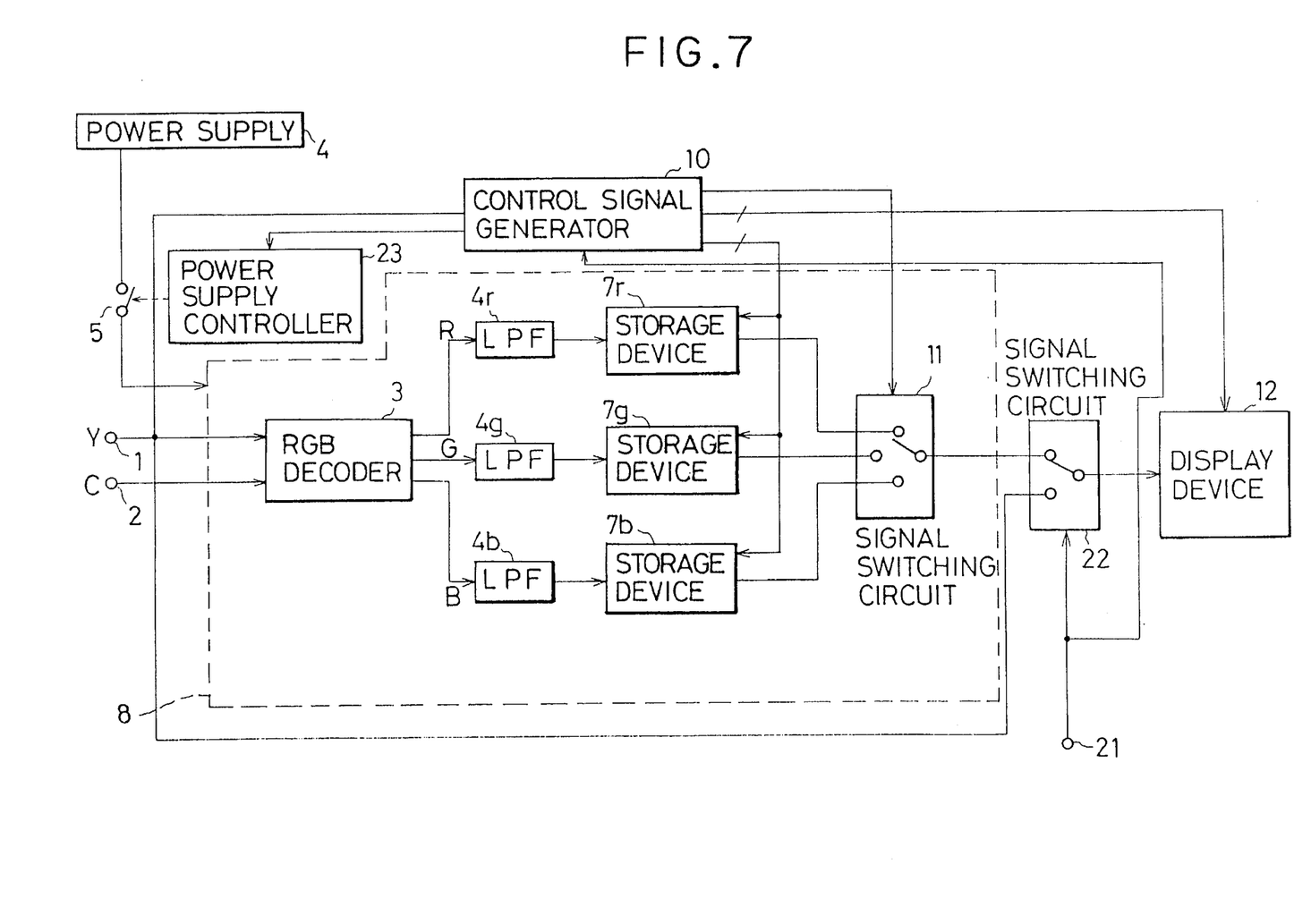
FIG. 7 is a block diagram showing a display apparatus of an embodiment of the invention.

An embodiment of the invention will now be described with reference to FIG. 7 and FIG. 8. In the figures, the components identical or corresponding to those in the prior art device are denoted by identical reference numerals. The apparatus of this embodiment is simliar to that of the prior art of FIG. 1, but additional components are a switching control signal terminal 21, an additional (second) signal switching circuit 22, and a power control circuit 23, a power supply switch 5. A power supply 4, whose illustration is omitted in FIG. 1, is additionally shown.

The switching control signal terminal 21 is for receiving a switching control signal used for switching between the color display and the black-and-white display. The switching control signal received is delivered to the signal switching circuit 22 and the control signal generator 10.

The control signal generator 10 extracts sync signals from the luminance signal and produces various control signals. One of the control signals is applied to the display device 12. This control signal is applied to the control signal input terminal 52 (FIG. 2). The control signal is used over control for switching the scanning rate of the deflection circuit 58 and control over the VOR controllers 59 and 60.

The deflection circuit 58 operates as shown in FIG. 5A for the color display and as shown in FIG. 5B for the black-and-white display. As will be seen from FIG. 5A and FIG. 5B, the rate of vertical deflection (or scanning) for the color display is three times that For the black-and-white display. If the signals are of the NTSC system, the rate of vertical deflection for the black-and-white display is 60 Hz, for instance, and the rate of vertical deflection for the color display is 180 Hz. The horizontal deflection for the color display is also three times that for the black-and-white display, although this is not seen from the figure. Time power consumed for the deflection is larger when the frequency of the deflection is higher.

The variable optical retarders 54 and 56 are turned on or off, and are controlled by the VOR controller 59 or 60. Tile VOR controllers 59 and 60 arc controlled by the control signal generator 10. By the selective turning-on and turning-off of the variable optical retarders, the light output from the selective filter 70 is altered as shown in FIG. 3. In the state (a), green light is output. In the state (b), red light is output. In the state (c), blue light is output. For the color display, red, green and blue light are output in sequence. Each of red, green and blue images are displayed over 1/180 second, so that cycle of red, green and blue sequential display takes 1/60 second.

In the state (d), light of all the color components is output. Since the CRT 51 is a black-and-white display device, a black-and-white image is displayed. That is, for the black-and-white display, the variable optical retarders 54 and 56 are fixed at the state (d).

THE signal switching circuit 22 selects either the R, G and B sequential signals for a triple rate scanning or the luminance signal for the normal rate scanning. For the black-and-white display, the luminance signal as applied to the luminance signal input terminal 1 is selected and supplied to the display device 12. The luminance signal thus supplied is not band-limited and therefore has a high-frequency-band components. If desirable, luminance signal may be subjected to high-frequency-band compensation.

The power control circuit 23 controls the supply of power, and in particular to interrupt supply of power depending on whether the system is in the color display mode or the black-and-white display mode. That is, color image processing circuit including the RGB decoder 3, the low-pass filters 4r, 4g and 4b, the R, G and b storage devices 7r, 7g and 7b, and the signal switching circuit 11 are not required in the black-and-white display mode, so that the power control circuit 23 interrupts the supply of power to these circuit during the black-and-white display mode, by opening the switch 5 connecting the power supply 4 to the above-mentioned color image processing circuit generally denoted by 8. By such operation, power consumption is reduced. This arrangement is particularly advantageous when the power supply is formed of a battery.

The switching between the color display and the black-and-white display can also be conducted automatically, depending on whether the video camera is manipulated or left unchanged. When manipulation of the video camera occurs such as when zooming, panning, tilting, iris adjustment, is performed, or when the start/stop key is pressed; it is desirable to employ the color display. On the other hand, when the above manipulation is not performed, or a certain predetermined time has elapsed after the manipulation, the black-and-white display suffices. Moreover, the color display mode may be selected when the power supply is turned on. This is because some manipulation is generally made when the power supply is turned on. Such control is made by the control signal generator 10. It is also convenient if the automatic power saving function for the automatic switching between the color display mode and the black-and-white display mode can be selectively turned on or off, by manipulation of a certain key for example.

Figure 8:
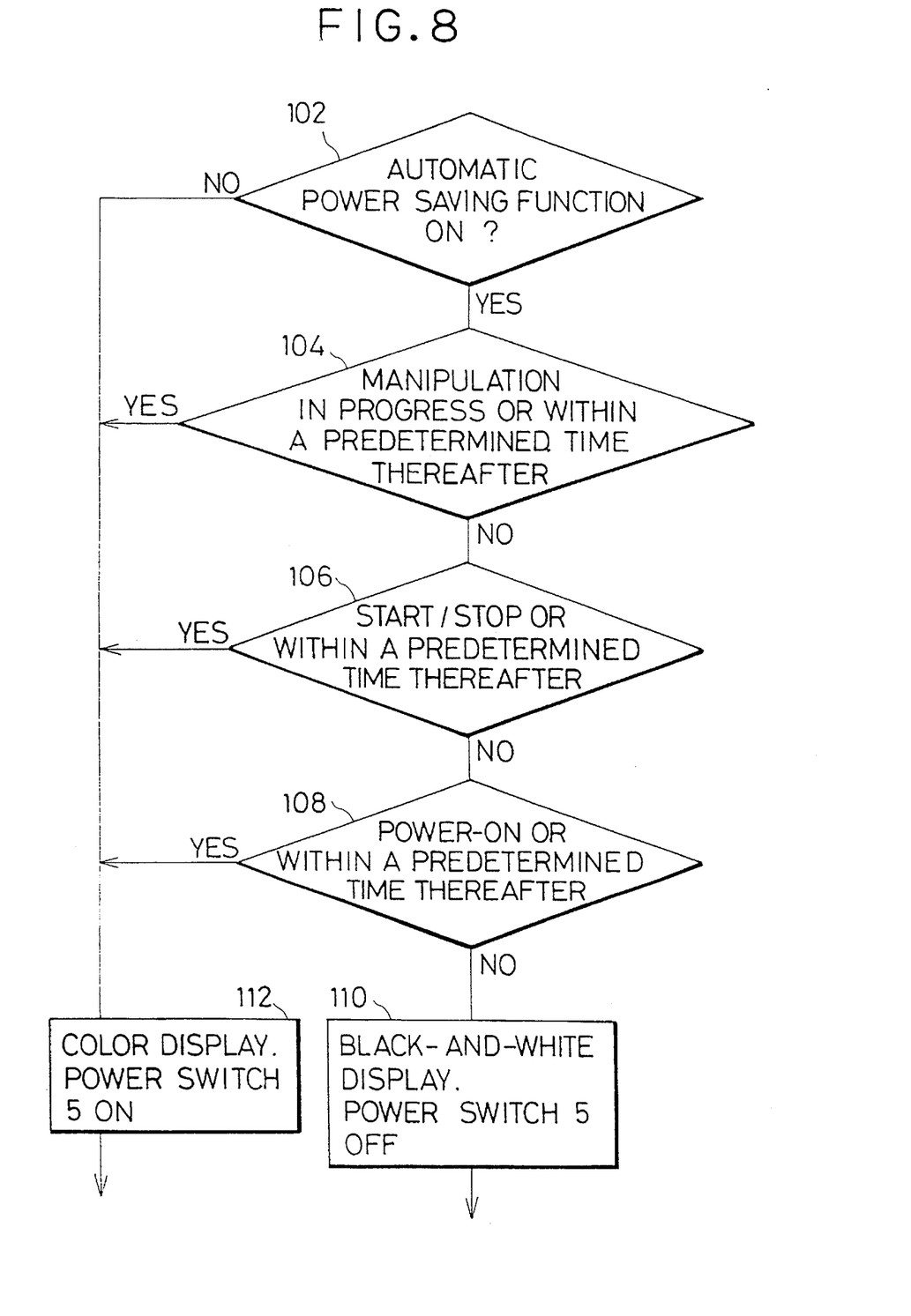
FIG. 8 is a flow chart showing the operation of the control signal generator for automatic power saving.

When the above-described function of the control signal generator 10 is implemented by a programmed computer forming part of the control signal generator 10, the operation performed is as illustrated in FIG. 8. First, judgment is made as to whether the automatic power saving function is turned on (102). If it is on, judgment is next made as to whether or not manipulation for zooming, panning, tilting, or iris adjustment is being made, or it is still within a predetermined time after the such manipulation (104). If it is not, judgment is next made as to whether or not the start/stop key is being pressed for starting or stopping the image pick-up or it is still within a predetermined time after such pressing (106). If it is not, then judgment is made as to whether or not a power switch is turned on for supplying the power to the display apparatus (is in the process of being turned on, e.g. a power-on switch is being pressed) or it is still within a predetermined time after such power-on (108). If it is not, then the black-and-white display is selected and the power switch 5 is turned off (110). If the answer at the step 102 is No, or if the answer at any of the steps 104, 106 and 108 is Yes, then the color display is selected and the power switch 5 is turned on (112).

Embodiment 2

Another embodiment, Embodiment 2, will next be described with reference to FIG. 9. The configuration and operation of Embodiment 2 are identical to those of Embodiment 1. However, the device of Embodiment 2 is adapted to a situation where broad-band R, G and B signals are input and sync signals are separately input.

That is, the device of Embodiment 2 is provided with input terminals 32r, 32g and 32b for receiving three-primary-color R, G and B signals, and another input terminal 31 for receiving the vertical and horizontal sync signals in composite form. The control signal generator 10 receives the composite sync signals and separate them into into a separate vertical sync signal and a separate horizontal sync signal.

The color signals applied to the input terminals 32r, 32g and 32b are passed through the LPF's 4r, 4g and 4b and stored in the R, G and B storage devices 7r, 7g and 7b.

The color signals are also input to a matrix circuit 35, which produces a luminance signal by addition of the R, G and B signal after multiplication with respective coefficients. In the case of the NTSC system, the addition performed is:

0.30R+0.59G+0.11B

The luminance signal thus obtained still has a broad band. For the black-and-while display, the signal switching circuit 22 selects the output of the matrix circuit 35. For the color display, the signal switching circuit 22 selects the output of the signal switching circuit 11. When the black-and-white display is selected the control signal generator 10 causes the power switch 5 to be off so that the supply of power from the power supply 4 to color image processing circuit (generally denoted by 9) including the LPF's 4r, 4g and 4b, the storage devices 7r, 7g and 7b, and the signal switching circuit 11 is interrupted. The rest of the configuration and operation of Embodiment 2 are identical to those of Embodiment 1.

Figure 9:
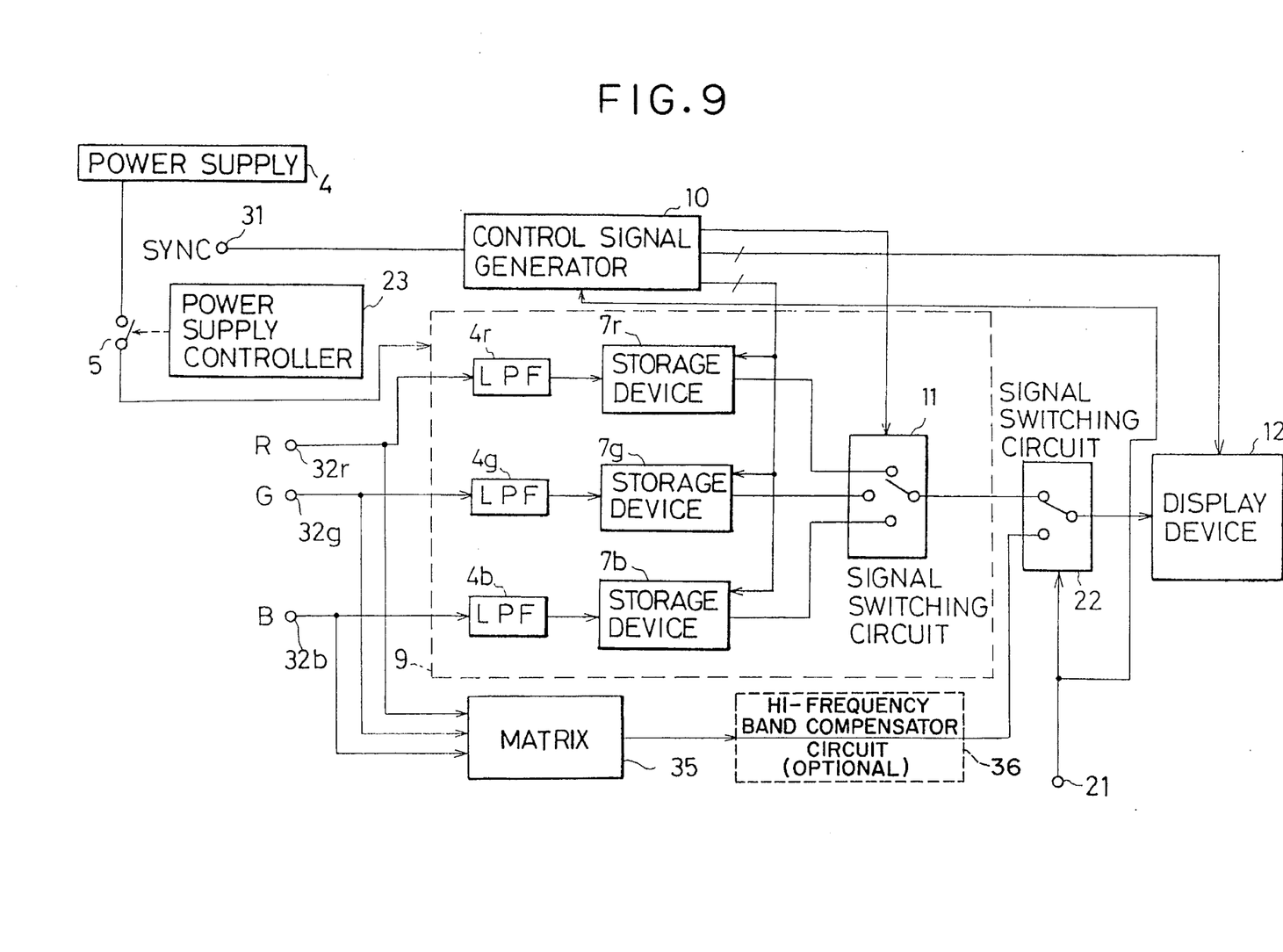
FIG. 9 is a block diagram showing a display apparatus of another embodiment of the invention.

As a modification to Embodiment 2, it is possible to insert a circuit 36, after the matrix 35, for high-frequency-band compensation to improve the resolution as shown in FIG. 9.

Embodiment 3

Figure 10A:
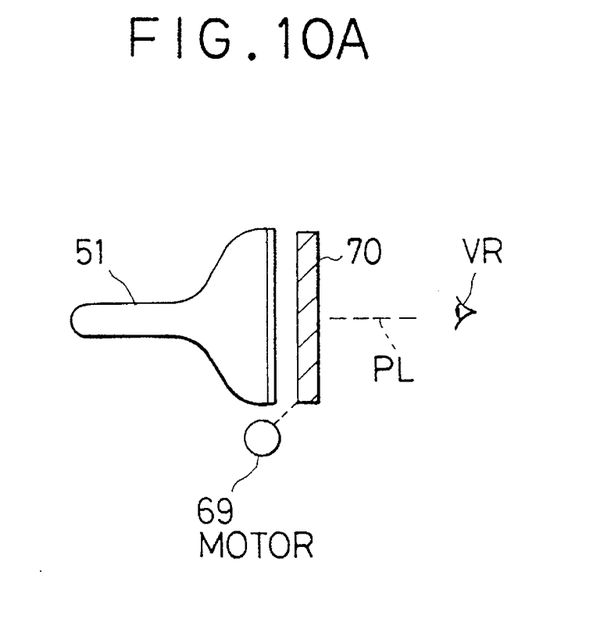
FIG. 10A and FIG. 10B are schematic diagrams showing a filter device in another embodiment of the invention.
Figure 10B:
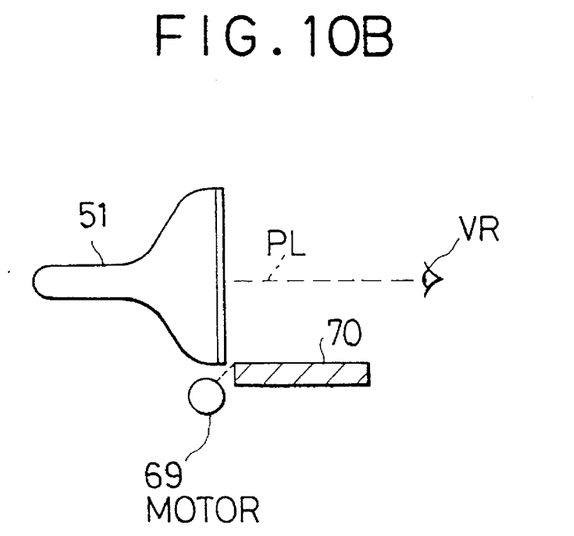

Another embodiment, Embodiment 3, is described with reference to FIG. 10A and FIG. 10B. In this embodiment, the selective filter 70 is moved, e.g., rotated, by a motor 69 controlled by a signal from the control signal generator 10, between a first position, shown in FIG. 10A, in which it is on the path PL of light from the CRT 51 to a viewer VR, and a second position, shown in FIG. 10B, in which it is out of the path PL of light. For the color display, the selective filter 70 is in the first position, and for the black-and-white display, the selective filter 70 is in the second position. The components shown in FIG. 2 are all required, but need not operate (or, in other words, at any of the states shown in FIG. 3) when the selective filter 70 is in the second position. Thus, power can be conserved in a fashion similar to previous embodiments.

The thickness of the selective filter 70 is about 10 mm or less, so that by positioning the selective filter 70 in the manner shown in FIG. 10B, above the light path, below the light path, or on either side of the light path, the light can be propagated without being obstructed by the selective filter 70.

Embodiment 4

Another embodiment, Embodiment 4, is next described with reference to FIG. 11A and FIG. 11B. In this embodiment, the selective filter 70 is part of an assembly 74 shown in FIGS. 11A and 11B, which also includes a focal point adjusting member 71 in the form of a transparent glass sheet 71, a reflecting mirror 72 having reflecting surfaces 72a and 72b on both surfaces. The assembly 74 is rotatable about an axis 75 between a first position shown in FIG. 11A and a second position shown in FIG. 11B. For the rotation, the assembly 74 is driven by a motor 69 similar to the motor 69 of Embodiment 3, and also controlled by the control signal generator 10. The selective filter 70 and the focal point adjusting member 71 are parallel with each other and opposite to each other with respect to the axis 75, while the reflecting mirror is at 45° with respect to the the selective filter 70 and the focal point adjusting member 71, and passes through the axis 75.

Figure 11A:
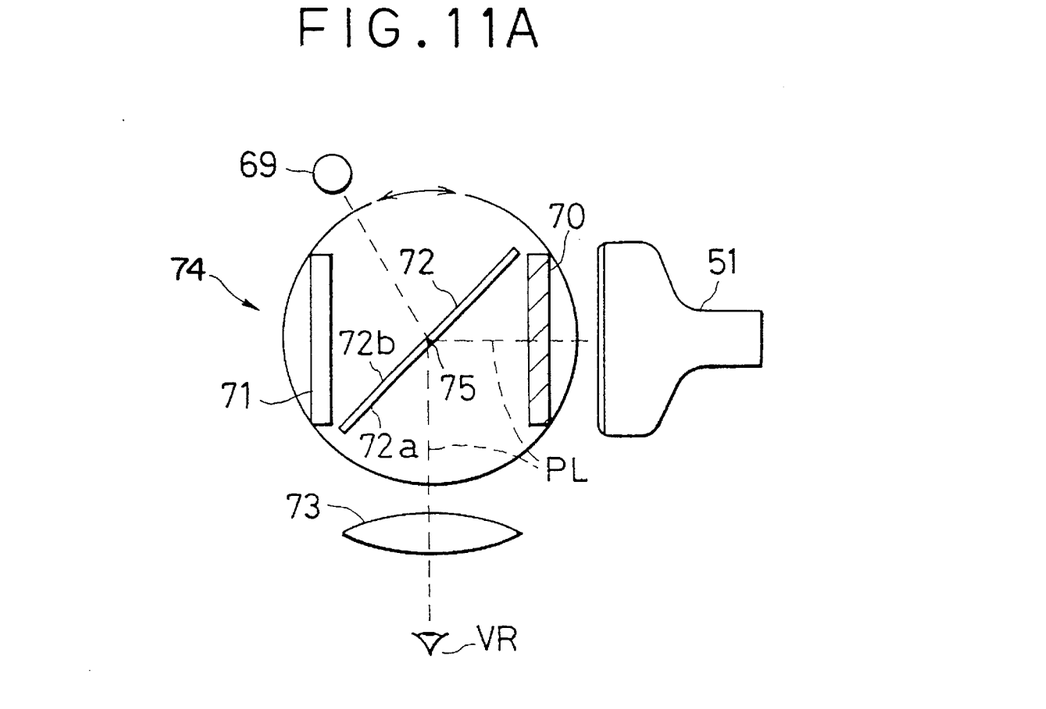
FIG. 11A and FIG, 11B are schematic diagrams showing a filter device in another embodiment of the invention, FIG, 12A and FIG, 12B are schematic diagrams showing a filter device in another embodiment of the invention.

In the first position shown in FIG. 11A, light from the CRT 51 is passed through the selective filter 70, and reflected by the first surface 72a of the reflecting mirror 72 and the reflected light is passed through an eyepiece 73 which is Fixed relative to the CRT 51. Thus, the selective filter 70 is on the path PL of light from the CRT 51 to the eyepiece 73. The light incident to the reflecting mirror 72 and the light reflected from the mirror 72 forms an angle of 90°. The light passing the selective filter 70 forms the R, G and B sequential images.

Figure 11B:
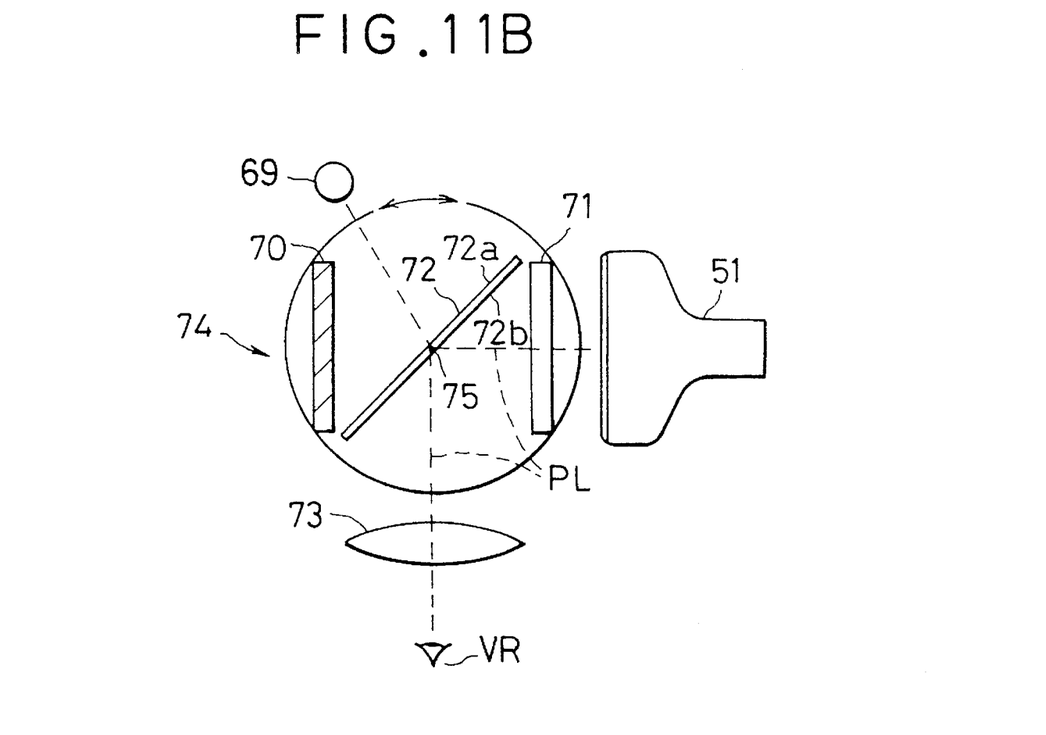

In the second position shown in FIG. 11B, the light from the CRT 51 is passed through the focal point adjusting member 71, and reflected by the second surface 72b of the reflecting mirror 72 and passed through the eyepiece 73. Thus, the selective filter 70 is out of the path PL of light From the CRT 51 to the eyepiece 73. The light incident on the reflecting mirror 72 and the light reflected from the second surface 72b of mirror 72 also forms an angle of 90°. The light not passing the selective filter 70 forms black-and-white images.

The configuration shown in FIG. 11A and FIG. 11B are suitable for application in a viewfinder of a video camera. The eyepiece 73 is used for showing a magnified image.

The reason for the insertion of the focal point adjusting member 71 is to avoid change in the focal point between the situation shown in FIG. 11A and the situation shown in FIG. 11B. If the focal point adjusting member 71 were not provided, the focal point would be changed between the situation shown in FIG. 11A and the situation shown in FIG. 11B because of the refraction index of the selective filter 70. If the focal point adjusting member 71 is so configured as to vary the focal point to the same extent as the selective filter 70, the focal point will not vary from the first position (FIG. 11A) to the second position (FIG. 11B).

In the conventional viewfinder, a reflecting mirror is also provided. So the additional components are the selective filter 70, and the focal point adjusting member 71 and the motor 69, so that increase in the size of the device is not significant.

In the above embodiment, a transparent glass sheet is used as the focal point adjusting member. As an alternative, a sheet of some other material may used as the focal point adjusting member 71.

Embodiment 5

Figure 12A:
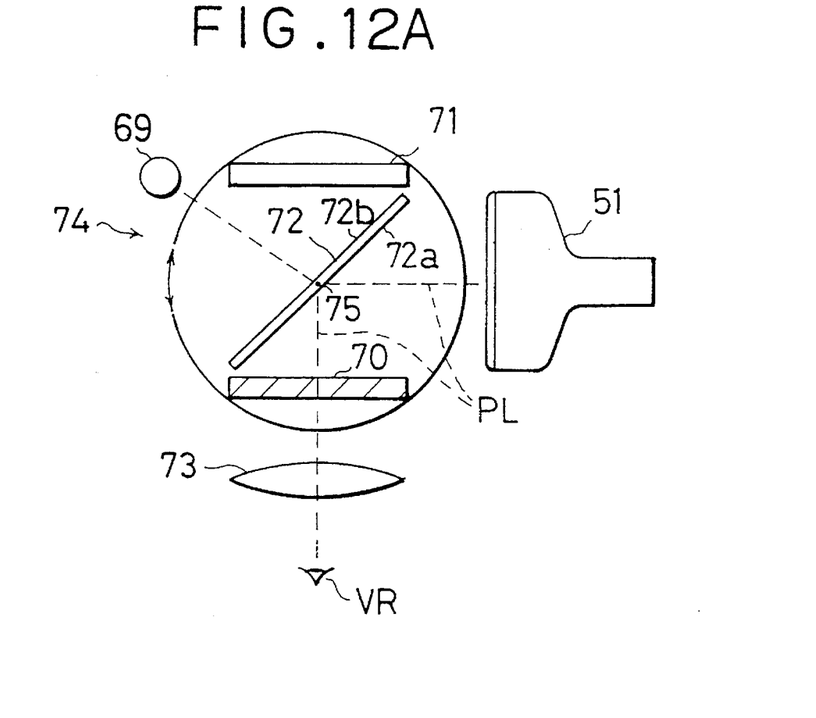
Figure 12B:
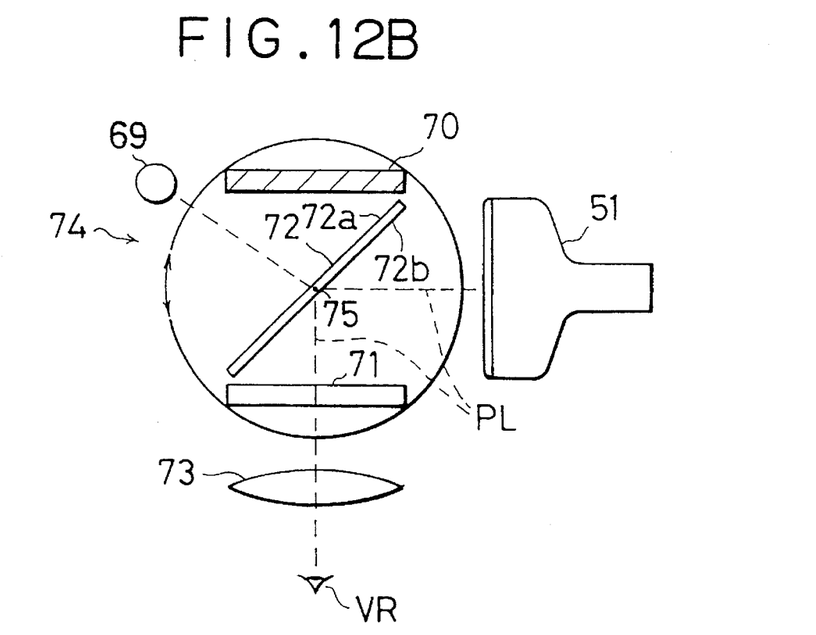

Another embodiment, Embodiment 5, is next described with reference to FIG. 12A and FIG. 12B. This embodiment is similar to Embodiment 4, in that the assembly 74 is rotated between the first position shown FIG. 12A in which the selective filter 70 is on the path PL of light from the CRT 51 to the eyepiece 73, and the second position shown in FIG. 12B in which the selective filter 70 is out of the path PL of light from the CRT 51 to the eyepiece 73. The difference Is that the selective filter 70 (FIG. 12A) or the focal point adjusting member 71 (FIG. 12B) is between the reflecting mirror 72 and the eyepiece 73. The effects similar to those described in connection with Embodiment 4 can be obtained.

Advantages

As has been described according to the invention, switching is made between the color display mode and the black-and-white display mode. In the black-and-white display mode, the signals have a broad band, and the scanning is made at a lower rate than in the color display mode, so that images obtained has a high resolution. Moreover, in the black-and-white display mode, the contrast can be increased, and the power consumption can be reduced.

What is claimed is:

1. A dual-mode image display apparatus having a first mode in which at least one color image is displayed and a second mode in which at least one black-and-white image is displayed comprising:

an image generator means for generating at least one image and projecting light bearing said image;

a selective filter; and means for moving said selective filter between a first position in which the selective filter is in a path of light from said image generator means to a viewer, and a second position in which the selective filter is not in said path of light from said image generator means to the viewer whereby said first position corresponds to said first mode and said second position corresponds to said second mode;

control means for causing said selective filter to be in the first mode in which said selective filter sequentially serves as a red, green and blue filter, and the second mode in which said selective filter transmits substantially all color components of said projected light;

whereby the image display apparatus can selectively perform color display or black-and-white display.

2. The dual-mode image display apparatus according to claim 1, further comprising:

a reflecting mirror having first and second reflecting surfaces on both sides to reflect the light projected from said image generator means;

a focal point adjusting member in the form of a transparent sheet;

said selective filter, said reflecting mirror and said focal point adjusting member in combination forming a filter assembly rotatable about an axis of rotation;

said selective filter and said focal point adjusting member being parallel with each other and opposite to each other with respect to said axis of rotation, and said reflecting mirror extending to pass through said axis of rotation and being at an angle relative to said selective filter and said focal length adjusting member;

said filter assembly being rotatable between a first position in which the light projected from said image generator means is reflected on said first reflecting surface of the reflecting mirror and is directed to the viewer, with the light passing through the selective filter before said light reaches the viewer and not passing through the focal point adjusting member, and a second position in which the light projected from said image generator means is reflected on said second reflecting surface of the reflecting mirror and is directed to the viewer, with the light passing through the focal point adjusting member before said light reaches the viewer and not passing through the selective filter.

3. The dual-mode image display apparatus according to claim 2, wherein said reflecting mirror is at an angle of about 45° with respect to said selective filter and said focal point adjusting member.

4. The dual-mode image display apparatus according to claim 2, wherein said first position interposes said selective filter between said image generator means and said reflecting mirror.

5. The dual-mode image display apparatus according to claim 1, wherein said image generator means generates said image at a rate which is lower in said second mode than in said first mode.

6. The dual-mode image display apparatus according to claim 5, wherein said image generator means generates images in accordance with an input signal having an input signal scanning rate and wherein the scanning rate in said second mode is equal to the input signal scanning rate and the scanning rate in said first mode is at a rate which is three times faster than the input signal scanning rate.

7. The dual-mode image display apparatus according to claim 1, wherein a luminance signal is used for display in said second mode having a frequency band that is wider than the frequency band of color signals used for display in said first mode.

8. A dual-mode image display apparatus having a first mode in which at least one color image is displayed and a second mode in which at least one black-and-white image is displayed comprising:

an image input means for inputting an image signal;

a color image processing means receiving the image signal from said image input means, said color image processing means including an A/D converter, a memory, and a D/A converter;

a selective filter; and control means for causing said selective filter to be in the first mode in which said selective filter sequentially serves as a red, green and blue filter, and the second mode in which the selective filter is bypassed so that a luminance signal is provided to said display; and a power supply control means that interrupts a supply of power from a power supply to said color image processing means when said apparatus is in the second mode.

9. The image display apparatus according to claim 1, wherein said selective filter can selectively transmit red light only, green light only or blue light only.

10. The image display apparatus according to claim 9, wherein said selective filter can selectively transmit the red light only, the green light only, the blue light only, or substantially all color components.

11. The image display apparatus according to claim 9, wherein said selective filter comprises:

a first polarization filter having a polarization axis for transmission of the red light only, and a polarization axis for transmission of substantially all color components;

a second polarization filter having a polarization axis for transmission of the green light only, and a polarization axis for transmission of substantially all the color components;

a third polarization filter having a polarization axis for transmission of the blue light only, and a polarization axis for transmission of substantially all the color components;

a first variable optical retarder in the form of a liquid crystal switch; and a second variable optical retarder in the form of a liquid crystal switch;

wherein said control means selectively causes each of said first and second variable optical retarders to be in an ON state or in an OFF state, depending on the color of the light to be transmitted.

12. The apparatus according to claim 2, wherein said first position interposes said selective filter between said reflecting mirror and the viewer.

13. The apparatus according to claim 2, further comprising an eyepiece, interposed between said selective filter and the viewer, for magnifying the light from the selective filter.

14. The apparatus according to claim 1, wherein said means for moving comprises a motor.

15. The apparatus according to claim 2, wherein said means for moving comprises a motor.

16. The apparatus according to claim 1, wherein said image generator means includes a color image processing means for color processing the at least one image in the second mode, the apparatus further comprising a power supply control means which supplies power from a power supply to said color image processing means when said dual-mode display apparatus is in the first mode and which interrupts a supply of power from the power supply to said color image processing means when said dual-mode image display apparatus is in the second mode.

17. The apparatus according to claim 16, wherein said dual-mode display apparatus is incorporated into a video camera including at least one video camera control and wherein said power supply control means switches said dual-mode display apparatus to said first mode when said at least one video camera control is operated.

18. The apparatus according to claim 17, wherein said video camera control includes a control for panning, zooming, tilting, iris adjusting, starting, or stopping.

19. The apparatus according to claim 2, wherein said image generator means includes a color image processing means for color processing the at least one image in the second mode, the apparatus further comprising a power supply control means which supplies power from a power supply to said color image processing means when said dual-mode display apparatus is in the first mode and which interrupts a supply of power from the power supply to said color image processing means when said dual-mode image display apparatus is in the second mode.

20. The apparatus according to claim 19, wherein said dual-mode display apparatus is incorporated into a video camera including at least one video camera control and wherein said power supply control means switches said dual-mode display apparatus to said first mode when said at least one video camera control is operated.

21. The apparatus according to claim 20, wherein said video camera control includes a control for panning, zooming, tilting, iris adjusting, starting, or stopping.

22. The apparatus according to claim 17, wherein said power supply control means switches said dual-mode display apparatus to said second mode when a predetermined time period has elapsed after said at least one video control is operated.

23. The apparatus according to claim 20, wherein said power supply control means switches said dual-mode display apparatus to said second mode when a predetermined time period has elapsed after said at least one video control is operated.

24. The apparatus according to claim 16, wherein said power supply control means switches said dual-mode image display apparatus to said first mode when said power supply is turned ON.

25. The apparatus according to claim 24, wherein said power supply control means switches said dual-mode image display apparatus to said second mode after said power supply is turned ON and a predetermined time period has elapsed.

26. The apparatus according to claim 19, wherein said power supply control means switches said dual-mode image display apparatus to said first mode when said power supply is turned ON.

27. The apparatus according to claim 26, wherein said power supply control means switches said dual-mode image display apparatus to said second mode after said power supply is turned ON and a predetermined time period has elapsed.

28. The apparatus according to claim 8, wherein said color image processing means further includes an RGB decoder and a signal switch circuit.

29. The apparatus according to claim 28, further comprising a video camera incorporating said dual-mode image display apparatus wherein said video camera includes at least one video camera control and wherein said power supply control means switches said dual-mode display apparatus to said first mode when said at least one video camera control is operated.

30. The apparatus according to claim 29, wherein said video camera control includes a control for panning, zooming, tilting, iris adjusting, starting, or stopping.

31. The apparatus according to claim 29, wherein said power supply control means switches said dual-mode display apparatus to said second mode when a predetermined time period has elapsed after said at least one video control is operated.

32. The apparatus according to claim 29, wherein said power supply control means switches said dual-mode image display apparatus to said first mode when said power supply is turned ON.

33. The apparatus according to claim 32, wherein said power supply control means switches said dual-mode image display apparatus to said second mode after said power supply is turned ON and a predetermined time period has elapsed.

34. The apparatus according to claim 9, further comprising a matrix circuit for converting an RGB input to a luminance signal and wherein said color image processing means further includes a signal switching circuit.

35. The apparatus according to claim 34, further comprising a video camera incorporating said dual-mode image display apparatus wherein said video camera includes at least one video camera control and wherein said power supply control means switches said dual-mode display apparatus to said first mode when said at least one video camera control is operated.

36. The apparatus according to claim 34, wherein said video camera control includes a control for panning, zooming, tilting, iris adjusting, starting, or stopping.

37. The apparatus according to claim 35, wherein said power supply control means switches said dual-mode display apparatus to said second mode when a predetermined time period has elapsed after said at least one video control is operated.

38. The apparatus according to claim 35, wherein said power supply control means switches said dual-mode image display apparatus to said first mode when said power supply is turned ON.

39. The apparatus according to claim 38, wherein said power supply control means switches said dual-mode image display apparatus to said second mode after said power supply is turned ON and a predetermined time period has elapsed.

40. The apparatus according to claim 8, further comprising a video camera which incorporates said dual-mode image display apparatus.

41. The apparatus according to claim 34, further comprising a high-frequency band compensation circuit interposed between said matrix circuit and a display.

* * * * *